US006765885B2

(12) United States Patent
Jiang et al.

(10) Patent No.: US 6,765,885 B2
(45) Date of Patent: Jul. 20, 2004

(54) DETERMINATION OF ACCEPTABLE SEQUENCE NUMBER RANGES IN A COMMUNICATIONS PROTOCOL

(75) Inventors: Sam Shiaw-Shiang Jiang, Hsin-Chu (TW); Alex Chung-Ming Sun, Chung-Li (TW)

(73) Assignee: ASUSTeK Computer Inc., Taipei (TW)

( * ) Notice: Subject to any disclaimer, the term of this patent is extended or adjusted under 35 U.S.C. 154(b) by 356 days.

(21) Appl. No.: 09/779,490

(22) Filed: Feb. 9, 2001

(65) Prior Publication Data

US 2002/0110095 A1 Aug. 15, 2002

(51) Int. Cl.⁷ .................................................. H04Q 7/00
(52) U.S. Cl. .................... 370/328; 370/394; 370/469
(58) Field of Search .............................. 370/313, 349, 370/350, 328, 394, 395.1, 231, 389, 469

(56) References Cited

U.S. PATENT DOCUMENTS

| | | | | |
|---|---|---|---|---|
| 5,926,468 A | * | 7/1999 | Chapman et al. ........... 370/328 |
| 5,930,233 A | * | 7/1999 | Kanerva et al. ............ 370/231 |
| 5,974,028 A | * | 10/1999 | Ramakrishnan ............. 370/229 |
| 6,389,016 B1 | * | 5/2002 | Sabaa et al. ................ 370/389 |
| 6,519,223 B1 | * | 2/2003 | Wager et al. ............... 370/216 |
| 2002/0118667 A1 | * | 8/2002 | Chintada et al. ............ 370/349 |

* cited by examiner

*Primary Examiner*—Kwang Bin Yao
*Assistant Examiner*—Thai D Hoang
(74) *Attorney, Agent, or Firm*—Winston Hsu

(57) ABSTRACT

A wireless communications protocol utilizes protocol data units (PDUs) for transmitting and receiving service data units (SDUs). Each PDU has a sequence number of n bits for indicating a relative sequential ordering of the PDU in a transmitted or received stream of PDUs. A transmission time interval (TTI) is also used in which a predetermined number of PDUs are transmitted or received. PDUs are received within a TTI. A starting sequence number and an ending sequence number for received PDUs within the TTI are found. Any received PDU within the TTI that has a sequence number that is sequentially before the starting sequence number or that is sequentially after the ending sequence number is discarded.

24 Claims, 9 Drawing Sheets

DETERMINATION OF ACCEPTABLE SEQUENCE NUMBER RANGES IN A COMMUNICATIONS PROTOCOL

BACKGROUND OF THE INVENTION

1. Field of the Invention

The present invention relates to a wireless communications protocol. More specifically, the present invention discloses a method for determining acceptable sequence number ranges in a transmission time interval.

2. Description of the Prior Art

The surge in public demand for wireless communication devices has placed pressure upon industry to develop increasingly sophisticated communications standards. The $3^{rd}$ Generation Partnership Project (3GPP™) is an example of such a new communications protocol. Such standards utilize a three-layer approach to communications. Please refer to FIG. 1. FIG. 1 is a block diagram of the three layers in a communications protocol. In a typical wireless environment, a first station 10 is in wireless communications with one or more second stations 20. An application 13 on the first station 10 composes a message 11 and has it delivered to the second station 20 by handing the message 11 to a layer 3 interface 12. The layer 3 interface 12 may also generate some layer 3 signaling messages 12a for the purpose of controlling layer 3 operations. An example of such a layer 3 signaling message is a request for ciphering key changes, which are generated by the layer 3 interfaces 12 and 22 of both the first and the second stations, respectively. The layer 3 interface 12 delivers either the message 11 or the layer 3 signaling message 12a to a layer 2 interface 16 in the form of layer 2 service data units (SDUs) 14. The layer 2 SDUs 14 may be of any length. The layer 2 interface 16 composes the SDUs 14 into one or more layer 2 protocol data units (PDUs) 18. Each layer 2 PDU 18 is of a fixed length, and is delivered to a layer 1 interface 19. The layer 1 interface 19 is the physical layer, transmitting data to the second station 20. The transmitted data is received by the layer 1 interface 29 of the second station 20 and reconstructed into one or more PDUs 28, which are passed up to the layer 2 interface 26. The layer 2 interface 26 receives the PDUs 28 and builds up one or more layer 2 SDUs 24. The layer 2 SDUs 24 are passed up to the layer 3 interface 22. The layer 3 interface 22, in turn, converts the layer 2 SDUs 24 back into either a message 21, which should be identical to the original message 11 that was generated by the application 13 on the first station 10, or a layer 3 signaling message 22a, which should be identical to the original signaling message 12a generated by the layer 3 interface 12 and which is then processed by the layer 3 interface 22. The received message 21 is passed to an application 23 on the second station 20.

Of particular interest is the layer 2 interface, which acts as a buffer between the relatively high-end data transmission and reception requests of the layer 3 interfaces 12 and 22, and the low-level requirements of the physical transmission and reception process at the layer 1 interfaces 19 and 29. Please refer to FIG. 2. FIG. 2 is a simplified diagram of a transmission/reception process from a layer 2 perspective. The layer 2 interface 32 of a first station 30 receives a string of SDUs 34 from the layer 3 interface 33. The layer 2 SDUs 34 are sequentially ordered from 1 to 5, and are of an unequal length. The layer 2 interface 32 converts the string of SDUs 34 into a string of layer 2 PDUs 36. The layer 2 PDUs 36 are sequentially ordered from 1 to 4, and are usually all of an equal length. The string of layer 2 PDUs 36 is then sent off to the layer 1 interface 31 for transmission. A reverse process occurs at the second station 40, with the second station 40 layer 2 interface 42 converting a received string of layer 2 PDUs 46 into a received string of layer 2 SDUs 44, which are then passed up to a layer 3 interface 43. There are two delivery modes: in-sequence delivery and out-of-sequence delivery. If the established connection between the first station 30 and the second station 40 is configured to be in the in-sequence delivery mode, the multi-layered protocol insists that the layer 2 interface 42 present the SDUs 44 to the layer 3 interface 43 in order. That is, the layer 2 interface 42 must present the layer 2 SDUs 44 to the layer 3 interface 43 in the sequential order of the SDUs 44, beginning with SDU 1 and ending with SDU 5. The ordering of the SDUs 44 may not be scrambled, nor may a subsequent SDU 44 be delivered to the layer 3 interface 43 until all of the prior SDUs 44 have been delivered. However, if the established connection is configured to be in the out-of-sequence delivery mode, the layer 2 interface 42 can present the layer 2 SDUs 44 to the layer 3 interface 43 out of sequential order.

In line transmissions, such requirements are relatively easy to fulfill. In the noisy environment of wireless transmissions, however, the second station 40 often misses data. Additionally, under some transmission modes, the layer 2 interface 32 of the first station 30 may actually discard some of the layer 2 SDUs 34 or layer 2 PDUs 36 after a predetermined amount of time if the layer 2 SDUs 34 or PDUs 36 have not been transmitted. Some layer 2 PDUs in the received string of layer 2 PDUs 46 will therefore be missing, either due to deliberate discarding from the transmitting side, or from improper reception on the receiver side. Ensuring that the layer 3 SDUs 44 are presented in order, when the system is in the in-sequence delivery mode, can thus pose a significant challenge. Even in the out-of sequence delivery mode, a layer 2 SDU 44 cannot be presented until all of its composing layer 2 PDUs 46 have been correctly received. The format of the layer 2 PDUs 36, 46 is thus carefully considered to help overcome these obstacles.

Generally speaking, there are two broad modes for transmitting and receiving data: acknowledged mode, and unacknowledged mode. For acknowledged mode data, the second station 40 sends a special acknowledging signal to the first station 30 to indicate successfully received layer 2 PDUs 46. No such signaling is performed for unacknowledged mode data. For purposes of the present discussion, only the unacknowledged mode of data transmission and reception is considered. Please refer to FIG. 3 in conjunction with FIG. 2. FIG. 3 is a block diagram of an unacknowledged mode data (UMD) PDU 50, as defined by the 3GPP™ TS 25.322 specification. The UMD PDU 50 is used to transmit unacknowledged mode SDU data from the layer 3 interface 33 of the first station 30, which is then received and reassembled by the second station 40 and presented to the layer 3 interface 43 as the layer 2 SDUs 44. That is, layer 2 UMD PDUs 36, 46 are used to carry the layer 2 SDUs 34, 44 that originate from the layer 3 interfaces 33, 43. The UMD PDU 50 is divided into several fields, as defined by the layer 2 protocol. The first field 51 is a sequence number (SN) field, and is seven bits long. Successive UMD PDUs have successively higher sequence numbers, and in this way a receiver can properly reassembled UMD PDUs 46 to form the SDUs 44. That is, if a UMD PDU 36 is transmitted with a sequence number value equal to 19, the next UMD PDU 36 would be transmitted with a sequence number value equal to 20, and so forth. The next field, 52a, is an extension bit, and when set indicates the presence of a following length indicator (LI). An LI may be either 7 bits long or 15 bits long, and is used to indicate the ending position of an SDU within the UMD PDU 50. If a single SDU completely fills the data region 58 of the UMD PDU 50, then the extension bit 52a would be zero, thereby indicating that no LI is present. In the example UMD PDU 50, however, there are at least two SDUs ending in the PDU 50: SDU_1 57a, and SDU_2 57b. There must, therefore, be two LIs to indicate the respective ends of the SDU_1 57a and the SDU_2 57b. A UMD PDU following the UMD PDU 50 would hold the LI for SDU_3 57c. The first LI, $LI_1$, is in field 56a following the extension bit field 52a, and marks the end of the SDU_1 57a. $LI_1$ 56a has an extension bit 52b that is set, indicating the presence of another LI, $LI_2$ in field 56b. $LI_2$ 56b indicates the ending position of the SDU_2 57b, and has an extension bit 52c that is cleared, signifying that there are no more LIs, and that the data region 58 is thus beginning. The data region is used to carry the SDUs 57a, 57b, 57c.

Please refer to FIG. 4 in conjunction with FIG. 5. FIG. 4 is a more detailed block diagram of a prior art layer 2 interface 60. FIG. 5 is a timing diagram of transmission time intervals (TTIs) 72. The layer 2 interface 60 comprises a radio link control (RLC) layer 62 on top of, and in communications with, a medium access control (MAC) layer 64. The MAC layer 64 acts as an interface between the RLC layer 62 and the layer 1 interface 61. The MAC layer 64 divides the transmission of PDUs 63, which the MAC layer 64 receives from the RLC layer 62, into a series of transmission time intervals (TTIs) 72. Each TTI 72 has an interval length that is identical to the other TTIs 72, such as a 20 milliseconds (ms) interval. Within the time span of each TTI 72, the MAC layer 64 sends off a set of transport blocks 74 to the layer 1 interface 61 to be transmitted. The set of transport blocks 74 comprises a predetermined number of transport blocks 74a. Each of the transport blocks 74a comprises one RLC PDU 75 and may optionally carry a MAC header 76. All of the RLC PDUs 75 and, thus, the transport blocks 74a within each TTI 72 are of the same length. The number of RLC PDUs 75 (or transport blocks 74a) within each transport block set 74 between TTIs 72 may change. For example, in FIG. 5 the first TTI 72 transmits six PDUs 75, and the subsequent TTI 72 transmits three PDUs 75. The actual data length of the PDUs 75 may also vary from TTI 72 to TTI 72, but is always the same within each TTI 72. Consequently, prior to transmission for each TTI 72, the MAC layer 64 informs the RLC layer 62 of the number of PDUs 75 required for the TTI 72, and the size for the PDUs 75 within the TTI 72. The RLC layer 62 composes SDUs 65a, held in a buffer 65, into appropriately sized PDUs, and delivers the required number of PDUs 63 to the MAC layer 64. As noted, the MAC layer may optionally add a MAC header 76 to each RLC PDU 75 to generate the transport blocks 74a for the transport block set 74, and then the transport block set 74 of PDUs 74 is sent off to the layer 1 interface 61 for transmission.

For purposes of security, PDUs 63, 75 are encrypted before being delivered to the layer 1 interface 61. The encryption is usually performed in either the MAC layer 64 or the RLC layer 62. For purposes of the present discussion, it will be assumed that encryption of the PDUs 63, 75 occurs in the RLC layer 62. Prior to delivering PDUs 63 to the MAC layer 64, an encryption engine 66 encrypts all but the first octet of data within each PDU 63, 75, and delivers encrypted PDUs 63 to the MAC layer 64. As the first octet of each PDU 63, 75 is not encrypted, the sequence number 51 (from FIG. 3) is transmitted in an unencrypted state. The reason for this is that the encryption engine 66 uses the sequence number 51 of each PDU 63, 75 to generate the encrypted PDUs 63, 75. Consequently, on the receiver side, the sequence number 51 must be made available to perform the decryption of the PDUs 75. The sequence number 51 of each PDU is used to form a count-c value 66c. The count-c value 66c is a 32-bit number that comprises a hyper-frame number (HFN) 66h as the most significant 25 bits, and the sequence number 51 of the PDU 63, 75 to be encrypted as the least significant 7 bits 66s. The HFN 66h is initially zero, but is incremented upon detection of rollover in the PDU 63, 75 sequence numbers 51. For example, if the HFN 66h has a value of zero, and a PDU 63, 75 has a sequence number value 51 of 127, count-c 66c would have a value of 127 that is used to encrypt the PDU 63, 75. A subsequent PDU 63, 75 would have a sequence number value 51 of zero, due to rollover, and the encryption engine 66 would thus increment the HFN value 66h to one. Count-c, used to encrypt this subsequent PDU 63, 75, would thus be 128. The sequence number values 66s are transmitted with the respective PDUs 75, as they are unencrypted. The HFN value 66h, however, is not transmitted, and thus must remain synchronized on both the reception and transmission sides for the PDUs 75 to be properly decrypted.

Please refer to FIG. 6 in conjunction with FIG. 4. FIG. 6 is a diagram of transmission and reception of PDUs 82 and 92. PDUs 82, each with an indicated sequence number (SN) value, are transmitted from a transmission side 80. The PDUs 82 are then received on a receiver side 90 and assembled into PDUs 92, each with an indicated sequence number (SN). The transmission side 80 sends a first block of PDUs 82 with sequence numbers incrementing from 110 to 112. The transmission side then discards PDUs 82 with sequence numbers ranging from 113 to 125, indicated by the Xs 83, and continues transmitting with sequence number values from 126 to 1. Rollover of the 7-bit sequence numbers occurs after a value of 127. Again, PDUs 82 are discarded that have sequence number values from 2 to 19, indicated by Xs 84, and then transmission continues with PDUs 82 having sequence number values incrementing from 20 to 23. More PDUs 82 are discarded, indicated by Xs 85, and transmission resumes with PDUs 82 having sequence number values beginning at 30. Discarding of the PDUs 83, 84 and 85 may occur at the transmission side 80 due to time-out errors, or for other reasons. The receiving side 90, however, is not directly informed of these PDU discards 83, 84 and 85, and infers them from the non-sequentiality of the sequence numbers in the received PDUs 92. For example, between received PDUs 93a and 93b, the receiving side 90 infers that the PDUs 83 have been discarded, and must react accordingly to properly reassemble the PDUs 92 into correct SDUs. At received PDU 96b, rollover occurs in the sequence numbers, and so the receiving side 90 increments its HFN 66h accordingly. Received PDU 96b thus uses a different HFN 66h for decryption than received PDU 96a. This is proper, as it tracks the HFNs 66h of the corresponding transmitted PDUs 86a and 86b. As noted previously, the synchronization of the HFN number 66h on the transmission side 80 with the reception side 90 is of critical importance for the proper decryption of the received PDUs 92.

Unfortunately, the transmission process is not error-free. PDUs 82 can get lost or corrupted. For example, on the reception side 90, a PDU 97 is received with an erroneous sequence number value of 100, instead of the correct sequence number value of 23 for the correspondingly transmitted PDU 87. A layer 1 circular redundancy check (CRC)

should generally detect errors in the received PDUs 92 and discard any found to be corrupted. However, it is possible for some corrupted PDUs 92 to avoid detection, and, for the present example, we may imagine that the corrupted PDU 97 has been damaged in such a way as to result in the incorrect sequence number value of 100. On the reception side 90, we may imagine that the encryption engine 66 uses an HFN value of one to decrypt the PDU 98a. This is the same HFN value 66h that was used on the transmission side 80 to encrypt the PDU 88a, and so the received PDU 98a is properly decrypted. The corrupted PDU 97 will not be properly decrypted, however, as its sequence number value of 100 does not correspond to the sequence number value of 23 that was used to encrypt the transmitted PDU 87. The RLC layer 62 on the reception side will also assume that PDUs 82 with sequence number values ranging from 23 to 99 were discarded by the transmission side 80. This is incorrect. Worse still, though, is that upon reception of the PDU 98b, the encryption engine 66 on the reception side 90 will incorrectly assume that PDUs 82 on the transmission side 80 with sequence number values ranging from 101 to 127 and zero to 29 were discarded prior to transmission, or were lost in transmission. The encryption engine 66 on the reception side 90 will thus assume that rollover of the sequence numbers has occurred and increment its HFN value 66h accordingly. The reception-side 90 HFN value 66h will thus go from a value of one to a value of two. When the reception side 90 attempts to decrypt the received PDU 98b, an HFN 66h value of two will be used, which is out of synch with the HFN value 66h of one used on the transmission side 80. The PDU 98b will thus be improperly decrypted, resulting in a meaningless PDU 92. Additionally, as the HFN values 66h on the transmission side 80 and reception side 90 are no longer synchronized, all subsequent received PDUs 92 will also be improperly decrypted. The communications channel between the reception side 90 and transmission side 80 is effectively destroyed.

SUMMARY OF THE INVENTION

It is therefore a primary objective of this invention to provide a method for determining acceptable ranges of received sequence numbers in a wireless communications protocol.

Briefly summarized, the preferred embodiment of the present invention discloses a method for determining acceptable ranges of received sequence numbers in a wireless communications protocol. The wireless communications protocol utilizes protocol data units (PDUs) for transmitting and receiving service data units (SDUs). Each PDU has a sequence number of n bits for indicating a relative sequential ordering of the PDU in a transmitted or received stream of PDUs. A transmission time interval (TTI) is also used in which a predetermined number of PDUs are transmitted or received. PDUs are received within a TTI. A starting sequence number and an ending sequence number for received PDUs within the TTI are found. Any received PDU within the TTI that has a sequence number that is sequentially before the starting sequence number or that is sequentially after the ending sequence number is discarded.

It is an advantage of the present invention that by discarding PDUs in the TTI that have sequence number values that are not within the range of the starting and ending sequence numbers, loss of synchronization in the hyper-frame numbers between transmitting and receiving stations is avoided. Additionally, the discarding of such PDUs helps to prevent the passing up to higher layers of corrupted data.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

In the following description, a communications protocol as disclosed in the 3GPP™ specification TS 25.322, V3.5.0, is used by way of example. However, it should be clear to one in the art that any wireless communications protocol that suffers from data corruption of received protocol data units (PDUs) may utilize the discarding method of the present invention. It should be further noted that a station in the following description could be both a transmitter and receiver of information. Such a station might be a cellular telephone, a personal data assistant (PDA), a personal computer (PC), or any other device that utilizes the wireless communications protocol.

Figure 1:
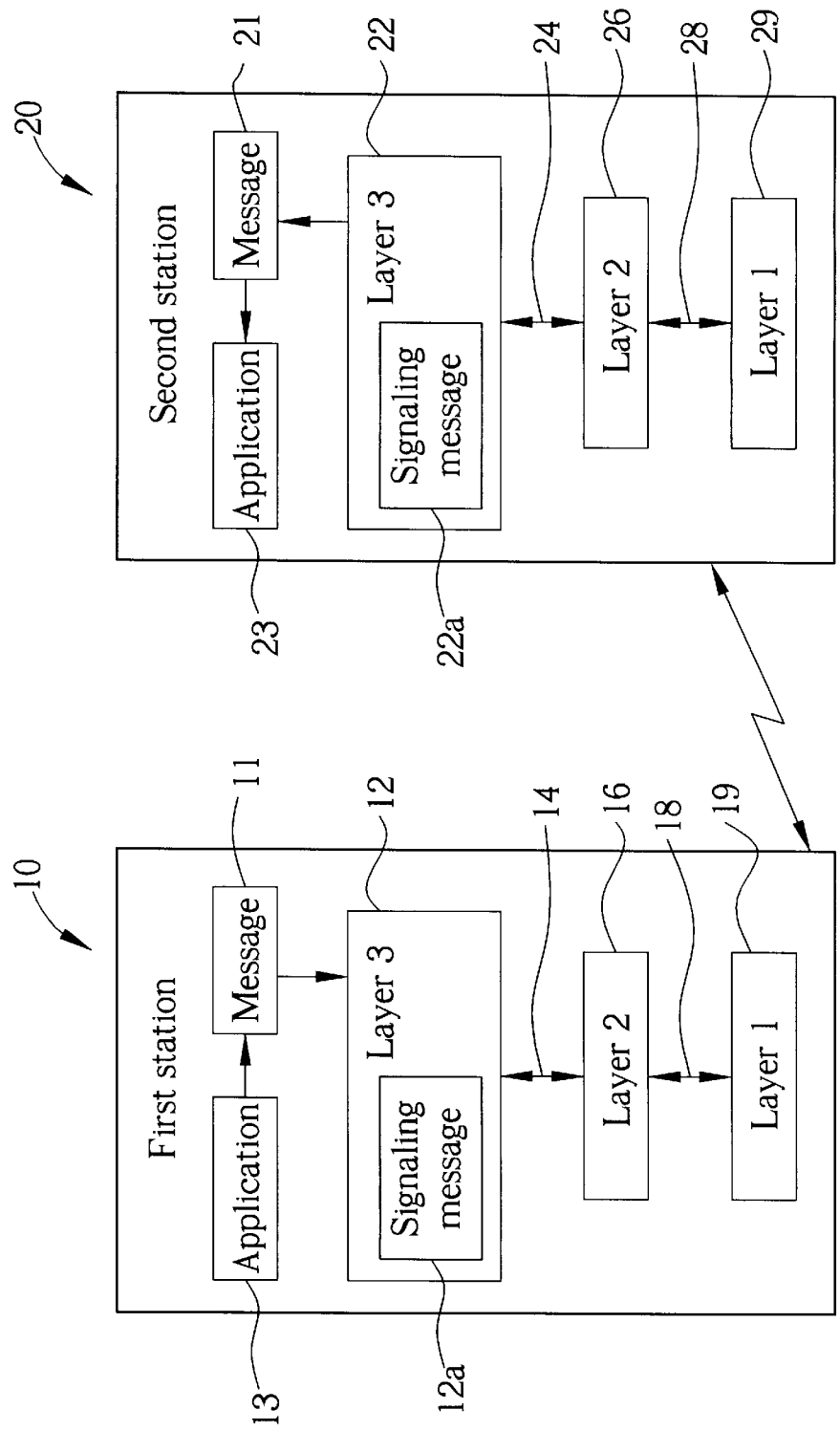
FIG. 1 is a block diagram of a three-layer communications protocol.
Figure 2:
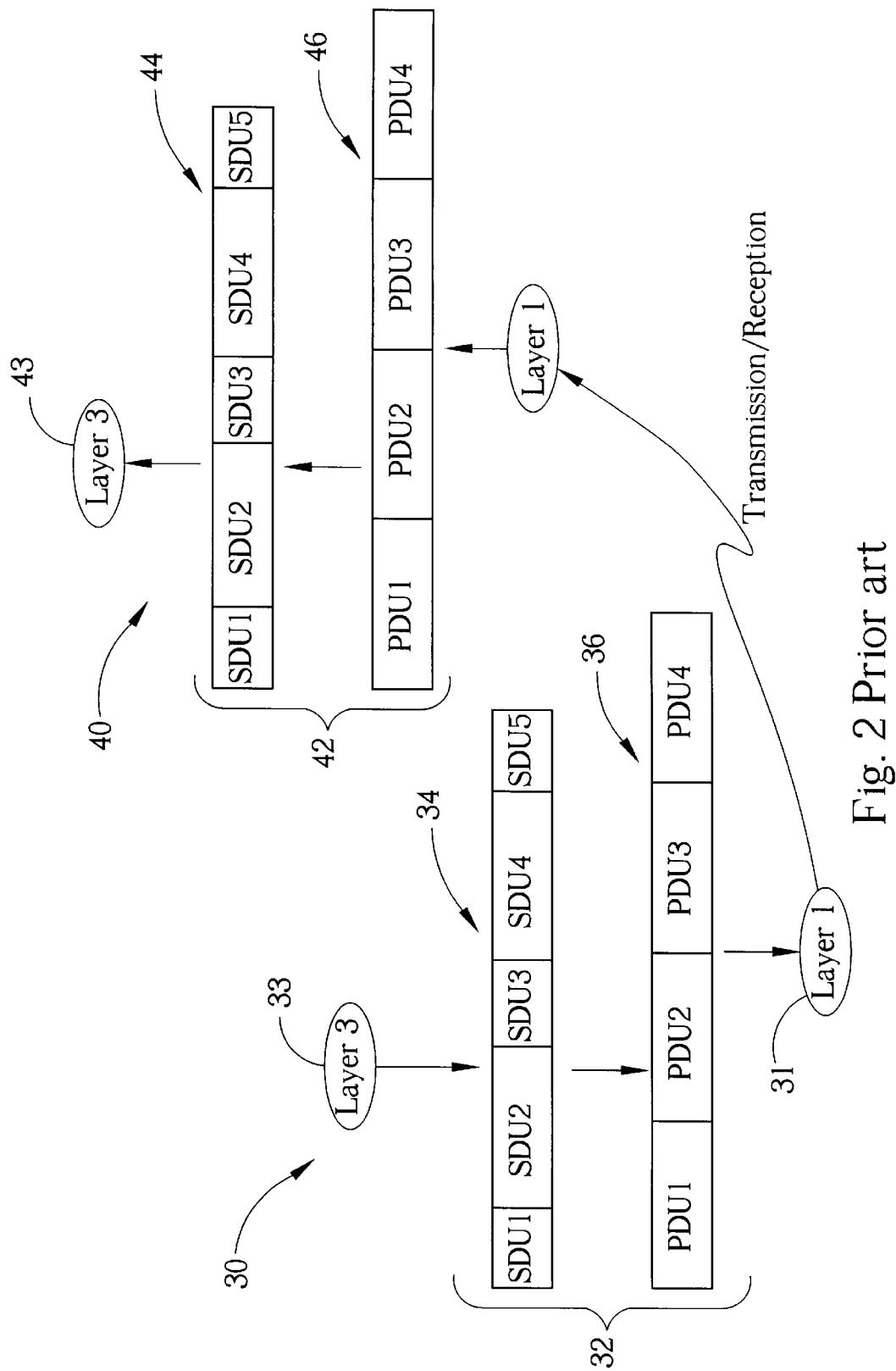
FIG. 2 is a simplified diagram of a transmission/reception process from a layer 2 perspective.
Figure 3:
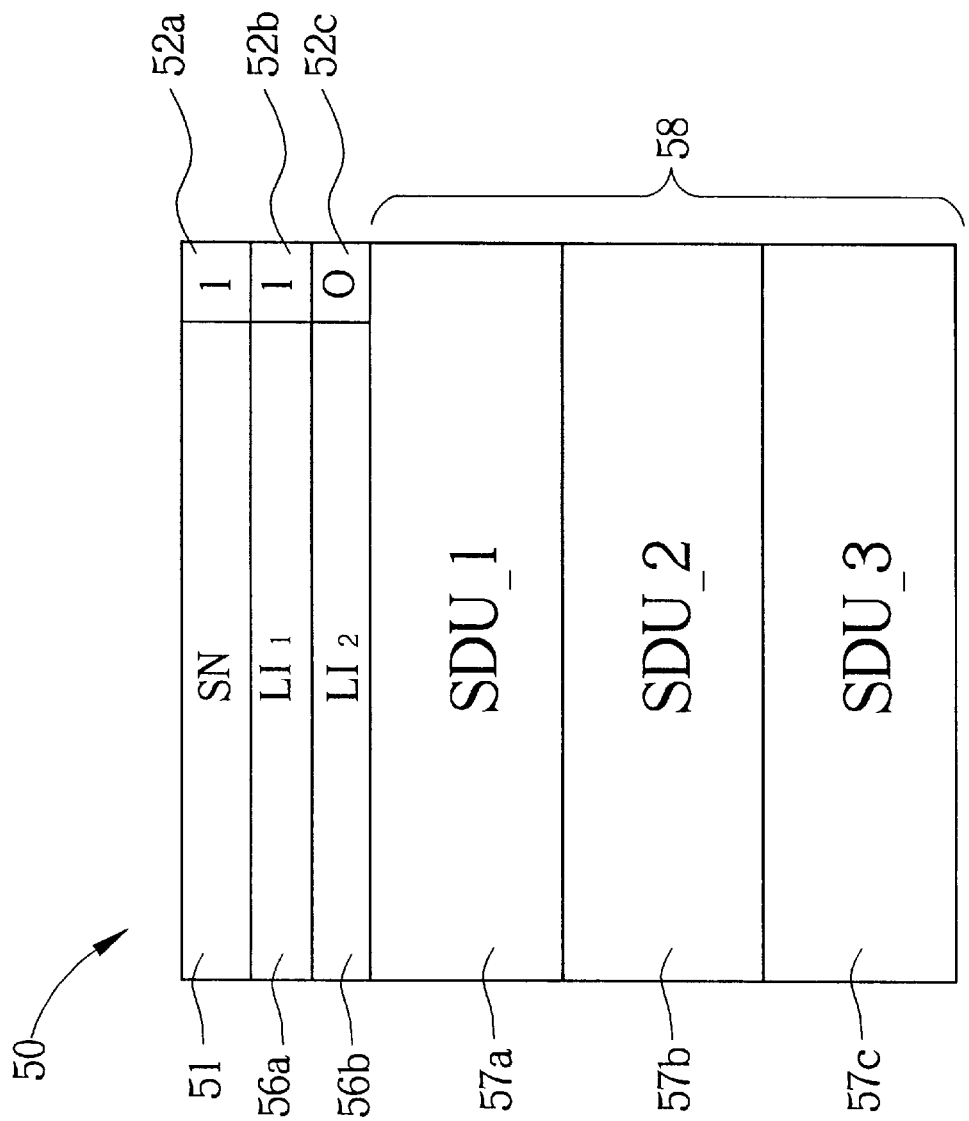
FIG. 3 is a block diagram of an unacknowledged mode data (UMD) protocol data unit (PDU).
Figure 4:
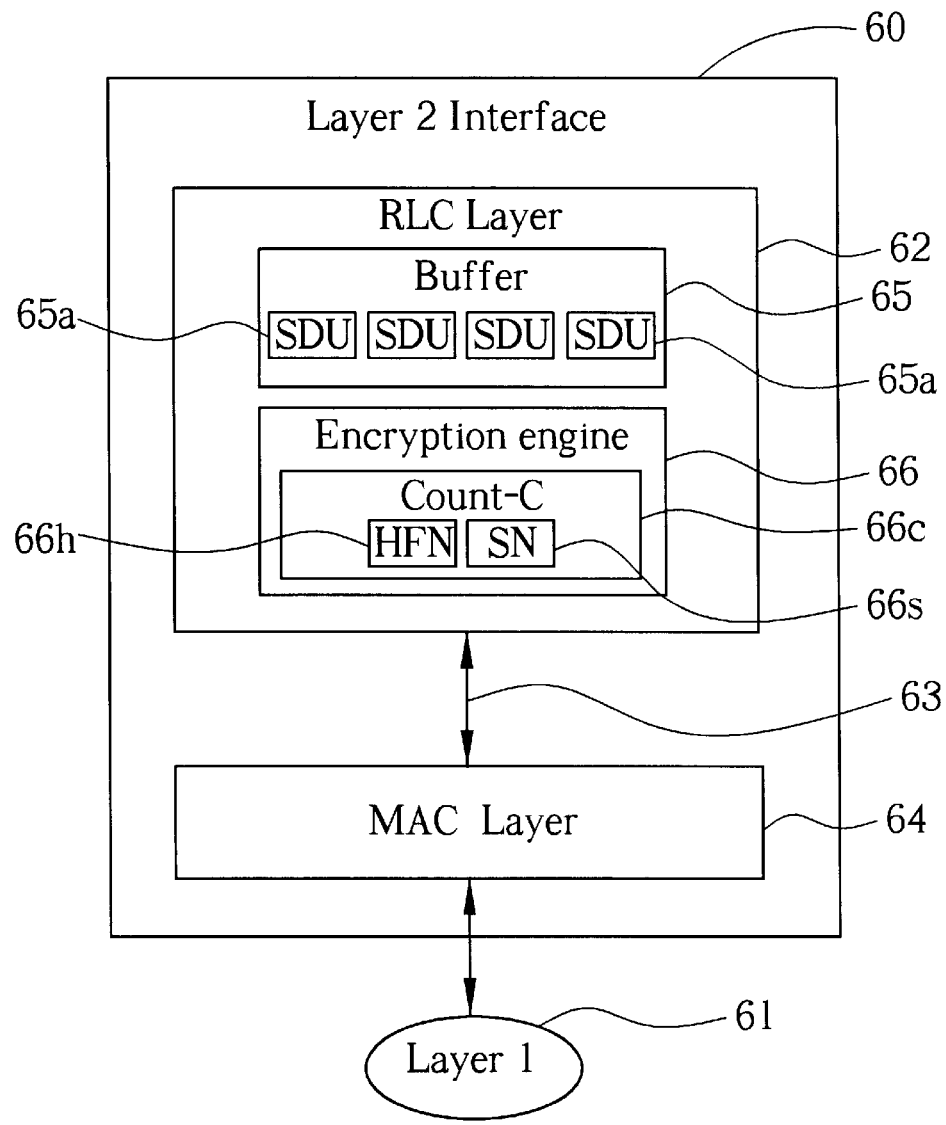
FIG. 4 is a more detailed block diagram of a prior art layer 2 interface.
Figure 5:
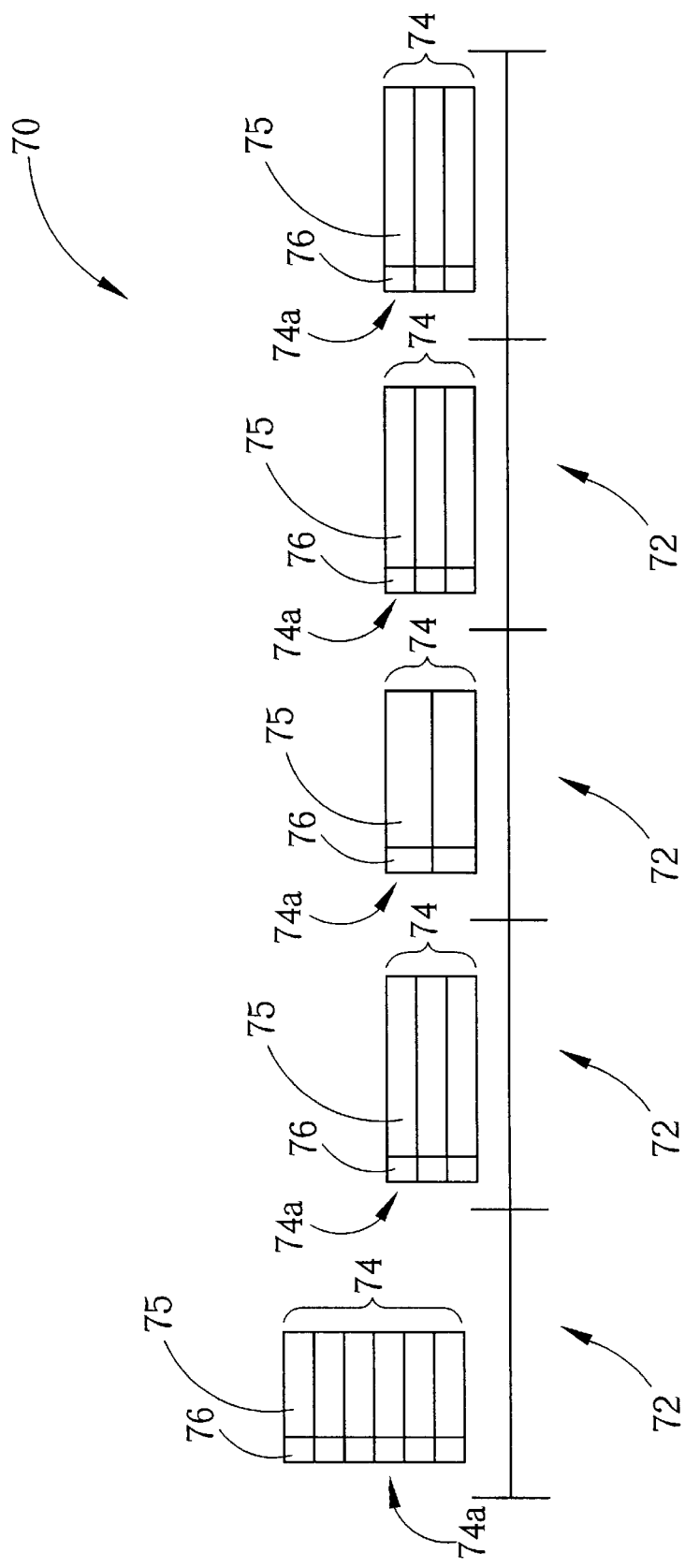
FIG. 5 is a timing diagram of transmission time intervals (TTIs).
Figure 6:
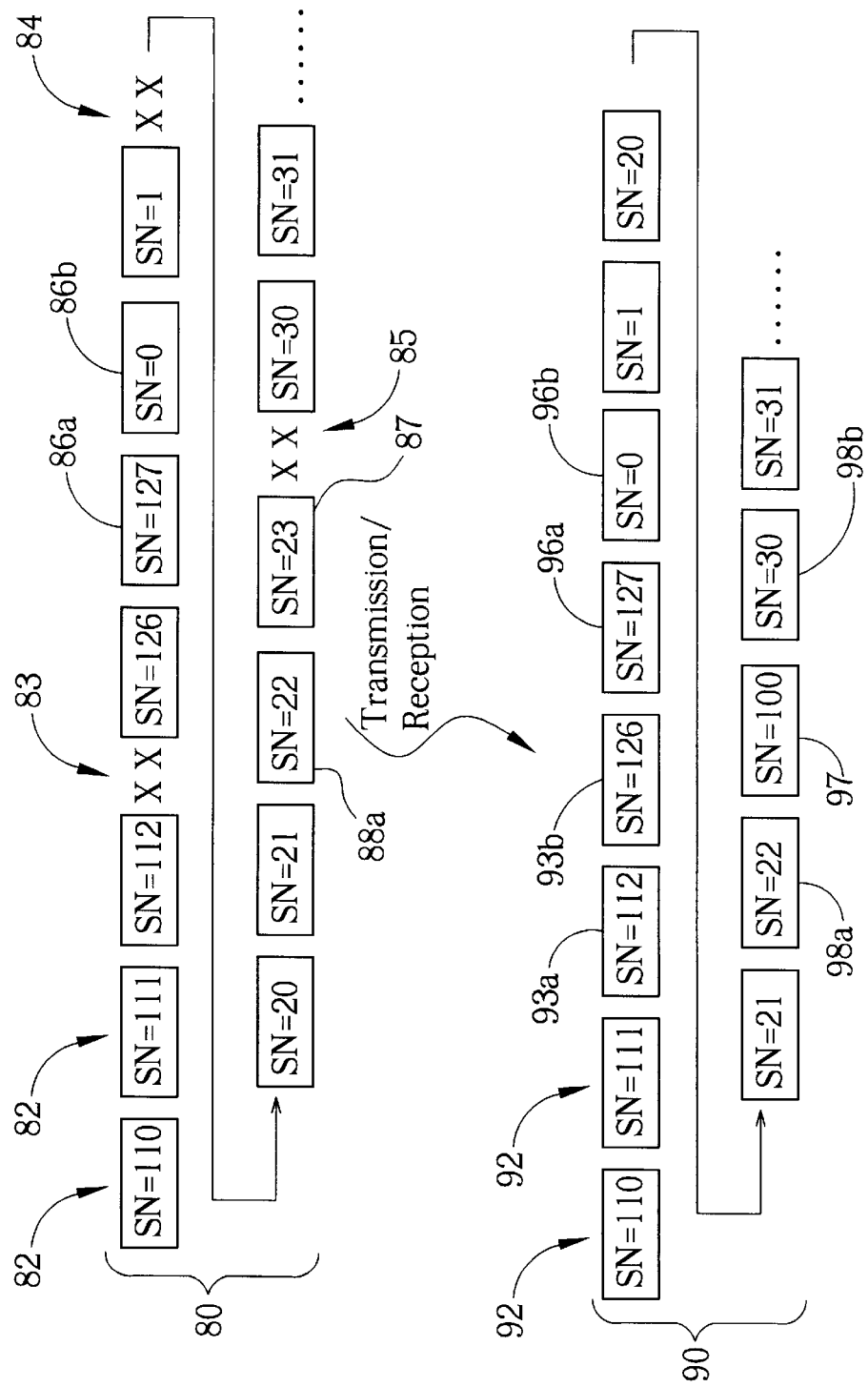
FIG. 6 is a diagram of transmission and reception of PDUs according to the prior art.
Figure 7:
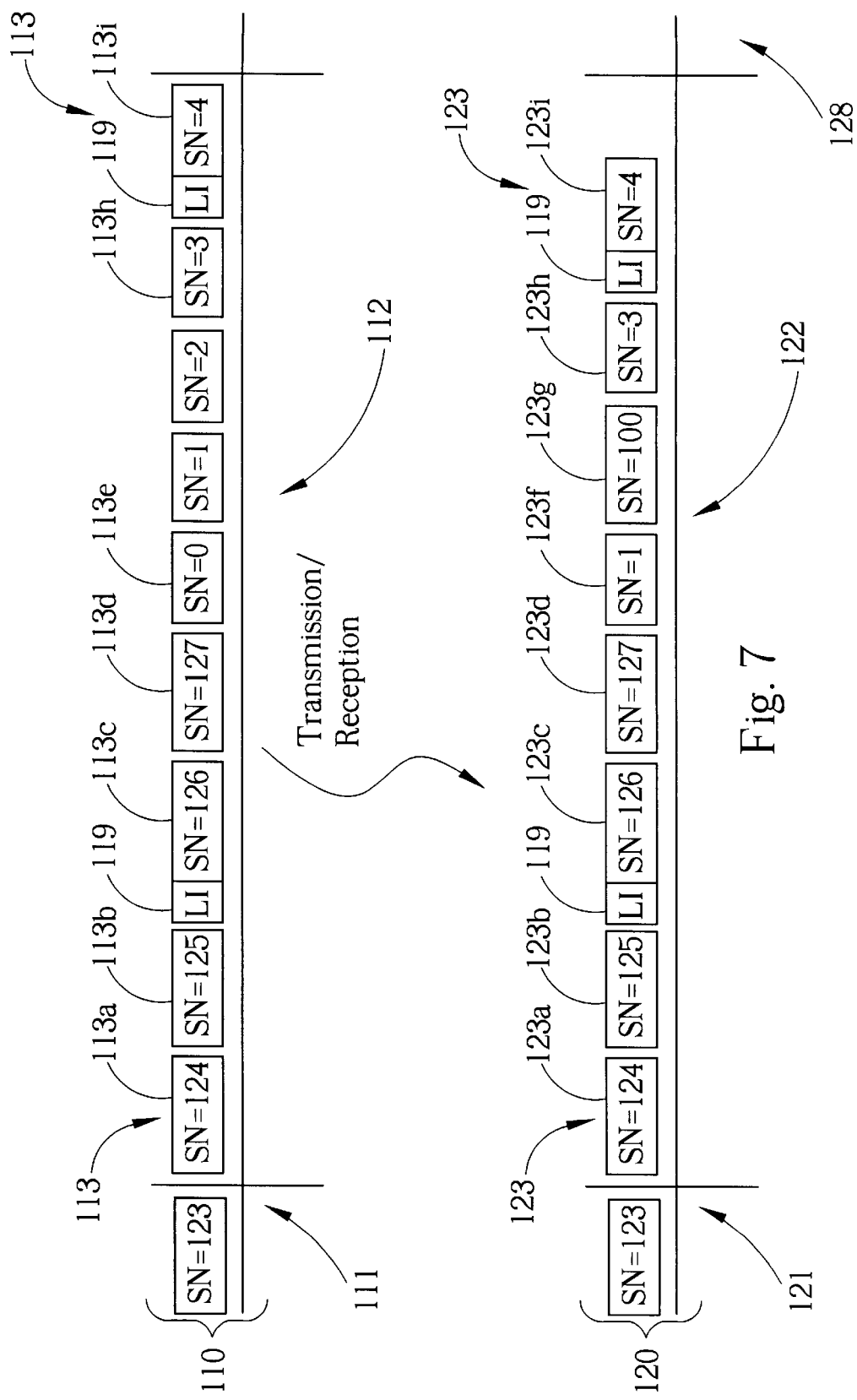
FIG. 7 is a diagram of transmission and reception of PDUs according to the present invention.
Figure 8:
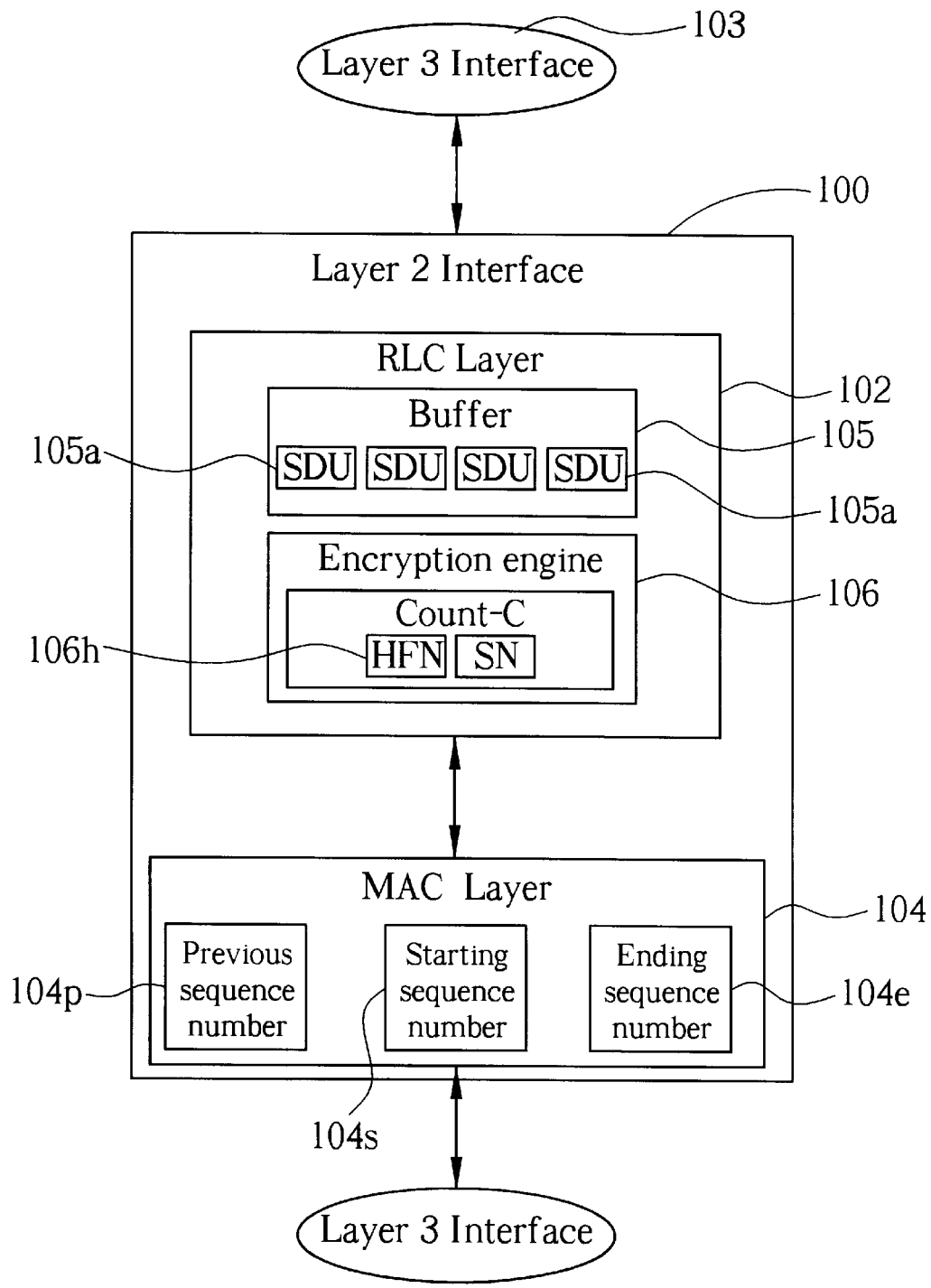
FIG. 8 is a block diagram of a present invention layer 2 interface.

It is the method of the present invention to ensure that all received protocol data units (PDUs) within a transmission time interval (TTI) have sequence number (SN) values that are sequentially within a predetermined range for the TTI. Please refer to FIG. 7 and FIG. 8. FIG. 7 is a diagram of transmission and reception of PDUs 113 and 123 according to the present invention. FIG. 8 is a block diagram of a layer 2 transmission/reception interface 100 of the present invention. Except where noted, PDUs, service data units (SDUs) and TTIs of the present invention are as described in the Description of the Prior Art. Additionally, encryption of the PDUs, and the use of hyper-frame numbers (HFNs) and sequence numbers for the encryption/decryption process are as described in the prior art. To illustrate the method of the present invention, a simple example is presented. A layer 2 interface 100 on a transmission side 110 receives a string of SDUs 105a from a layer 3 interface 103. The SDUs 105a are held in a buffer 105, awaiting transmission. Due to time-out, some of the SDUs 105a are discarded, and hence are never transmitted. The medium access control (MAC) layer 104 informs the radio link control (RLC) layer 102 of the number and size of PDUs 113 for an impending TTI 112. For the present example, we assume that the TTI 112 is to deliver nine PDUs 113. The last sequence number used in a previous TTI 111 on the transmission side 110 held a value of 123. The RLC layer 102 thus increments the value of 123 by one to obtain a value of 124 for the sequence number of the first PDU 113a in the impending TTI 112. Successive PDUs 113 have incrementally higher sequence number values, regardless of whether or not SDUs 105a were discarded between successive PDUs 113. That is, each successive PDU 113 in the TTI 112 has a sequence number value that is always one higher than the previous PDU 113. Thus, the PDU 113b has a sequence number value of 125. Similarly, the PDU 113c has a sequence number value of 126. The PDU 113c, however, also utilizes a special length indicator (LI) 119. In order to enable the receiving side 120 to know that PDUs have been discarded by the transmission side 110 layer 2 interface 100 prior to transmission, the special LI 119 is used. The special LI 119 indicates that PDUs were discarded between the PDU 113b and the PDU 113c prior to transmission. A subsequent PDU 113d has a sequence number of 127. The encryption engine 106 on the transmission side 110 uses a hyper-frame number (HFN) 106h and the individual sequence numbers of the PDUs 113a–113d to encrypt the PDUs 113a–113d. Sequence number rollover occurs for the PDU 113e, and thus the HFN 106h is incremented. The PDU 113e uses the new HFN 106h for encryption, as do all subsequent PDUs 113. PDUs 113 were also discarded between PDUs 113h and 113i, and thus the PDU 113i utilizes the special LI 119 to indicate this.

The transmission side 110 transmits the PDUs 113 in the TTI 112 and the PDUs 113 are received in part by the receiving side 120, which generates received PDUs 123 for the reception-side TTI 122. The discarding method of the present invention may be utilized in either the MAC layer 104 or the RLC layer 102. For purposes of the present discussion, it is assumed that the present invention method is performed in the MAC layer 104. The reception-side 120 MAC layer 104 uses a previous sequence number value 104p to generate a starting sequence number value 104s. The highest expected sequence number value in the previous TTI 121 was a value of 123. That is, an ending sequence number value 104e for the previous TTI 121 held a value of 123. This value is incremented by one to obtain a value of 124 for the starting sequence number value 104s for the current TTI 122. The starting sequence number value 104s should thus be equal to the sequence number value of the first transmitted PDU 113a. The receiving side 120 MAC layer 104 knows that nine PDUs are to be received for the TTI 122, and uses this information to generate an ending sequence number value 104e. The ending sequence number value 104e is simply the starting sequence number value 104s plus the number of PDUs 123 expected in the TTI 122 minus one. For this example, then, the ending sequence number value is 124+9−1=4 (due to rollover of the 7-bit sequence number). The receiving side 120 MAC layer 104 will discard any received PDU 123 within the TTI 122 that does not have a sequence number that is sequentially within the bounds of the starting sequence number 104s and the ending sequence number 104e. Note that, due to the rollover of the sequence numbers, care must be taken to properly determine whether or not a sequence number is within the acceptable bounds. For the example at hand, only sequence numbers within the set (124, 125, 126, 127, 0, 1, 2, 3, 4) are acceptable. All other sequence numbers for the received PDUs 123 result in a discarding of the associated PDU 123.

The first received PDU 123a has a sequence number value of 124, and so is accepted. The same holds true for the second and third PDUs 123b and 123c, respectively. The PDU 123c contains the special LI 119. The receiving side 120 thus knows that PDUs 113 were discarded by the transmitting side 110 between the received PDUs 123b and 123c, and behaves accordingly when assembling the PDUs 123 into corresponding SDUs. Although the transmitted PDU 113e is completely missed on the receiving side 120, the receiving side 120 can correctly infer sequence number roll-over from the sequence number values held within the PDUs 123d and 123f. Both the PDU 123d and the PDU 123f have sequence number values that land within the acceptable range, as defined by the starting sequence number value 104s and ending sequence number value 104e, and so are accepted. As the sequence number value of the PDU 123f is less than the sequence number value for the previous PDU 123d, rollover of the sequence numbers is inferred, and the HFN 106h on the receiving side is incremented accordingly. Decryption of the PDU 123f is thus successfully performed with the new HFN 106h value. Non-sequentiality between the sequence numbers for the PDUs 123d and 123f implies that the PDU 113e was lost in transmission, and the receiving side 120 may react accordingly when assembling the PDUs 123d and 123f into corresponding SDUs. A corrupted PDU 123g is also received within the TTI 122. The corrupted PDU 123g, however, does not have a sequence number that lands within the acceptable range. The corrupted PDU 123g is thus discarded, and the HFN 106h on the receiver side is not modified. A subsequent PDU 123h is thus properly decrypted using a receiving side 120 HFN 106h value that is synchronized with the transmission side HFN 106h value. That is, the discarding of the corrupted PDU 123g prevents the transmission side 110 from becoming unsynchronized with the receiving side 120. A final received PDU 123i is thus also properly decrypted, as are all subsequent PDUs in a subsequent TTI 128.

Because the present invention uses a special LI 119 to indicate the transmission-side 110 discarding of PDUs 113, it is possible to ensure that the transmitted PDUs 113 all have sequence numbers that ascend without jumps or gaps. The receiving side 120 can use this information to discard any PDU 123 that is not within the expected range of sequence numbers for the current TTI 122. Additionally, as all PDUs 123 should have a proper sequential ordering, it is possible to discard any PDU 123 as corrupted that does not adhere to the sequential ordering of the previously received PDUs 123, even though the sequence number of the PDU 123 may be within the range of acceptable sequence numbers. For example, if the PDU 123h had a sequence number of two instead of three, the MAC layer 104 may still discard the PDU 123h as unacceptable as it is clear that the PDU 123h, based upon its position within the TTI 122, should have a sequence number value of three. This enables additional stringency on the acceptance of received PDUs 123.

Figure 9:
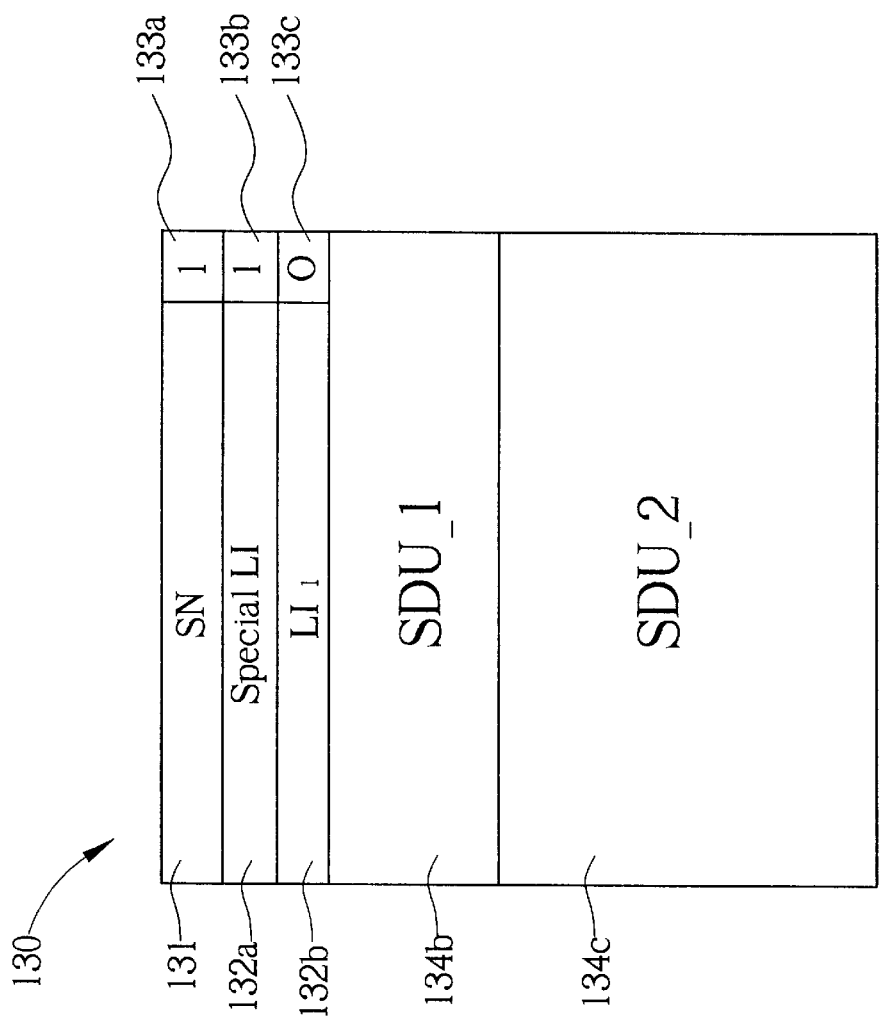
FIG. 9 is a block diagram of an example PDU according to the present invention.

In the above description, it should not be inferred that PDUs 113, 123, other than those with the special LI 119, have no LIs themselves. Quite the opposite is true. Every transmitted PDU 113 and received PDU 123 is capable of holding one or more LIs, as explained in the Description of the Prior Art. Such LIs are necessary to properly reconstruct SDUs from the received PDUs 123. The above description simply indicates the novel LI 119 of the present invention, and ignores, for the sake of brevity, any other acceptable and possible LIs within the PDUs 113, 123. To better illustrate the LIs of the present invention, please refer to FIG. 9. FIG. 9 is a block diagram of an example PDU 130 according to the present invention. The PDU 130 uses a special LI 132a to indicate that PDUs immediately prior to the PDU 130 were discarded prior to transmission. The first octet of the PDU 130 includes a 7-bit sequence number (SN) field 131 and a single extension bit 133a. The extension bit 133a indicates the presence of a following LI, when set. In the preferred embodiment, the special LI 132a is the first LI in the PDU 130, and is a value that exceeds the maximum possible length of the PDU 130. Other positions of the special LI 132a are, of course, possible. The special LI 132a may be either 7 or 15 bits in length, and is followed by a single extension bit 133b to indicate the presence or absence of a following LI. The extension bit 133b is set to indicate the presence of a subsequent LI, $LI_1$ 132b. $LI_1$ 132b indicates the end of SDU__1 134b. As there are no more LIs in the example PDU 130, the extension bit 133c for $LI_1$ 132b is cleared. The LI for SDU__2 134c will be found in a PDU that follows the PDU 130.

It is worth noting that the data in SDU__1 134b must be assumed to be the end of the data that was contained in the PDUs that were discarded on the transmission side prior to the PDU 130. Thus, the data in SDU__1 134b should also be discarded. Data from previously received PDUs may also have to be discarded, as it may mark the beginning of data that spans into the PDUs discarded on the transmission side. Re-assembly of PDUs into SDUs is, consequently, not a straightforward task, and requires some care. Note that $LI_1$ 132b might have a value of zero to indicate that no data is to be discarded from the PDU 130. Alternatively, two values may be utilized for the special LI 132a: The first value may indicate that data is to be discarded from the PDU 130, and the second value would indicate that no data is to be discarded from the PDU 130.

In contrast to the prior art, the present invention parses the sequence numbers of received PDUs within a TTI to ensure that the sequence numbers are all within an expected range for the TTI. Additionally, the present invention utilizes a special length indicator as a flag to signal that PDUs were discarded by the transmitter prior to transmission so that the receiver may properly reassemble received PDUs into SDUs. The use of this special LI enables a transmitter to transmit PDUs with smoothly incrementing sequence number values. The receiver can thus properly predict the expected range for the sequence numbers within the TTI. Additionally, as the sequence numbers smoothly ascend, the receiver can discard any PDU having a sequence number that does not conform to an expected value based upon the position of the PDU within the TTI.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for determining acceptable ranges of received sequence numbers in a wireless communications protocol, the wireless communications protocol utilizing:
   protocol data units (PDUs) for transmitting service data units (SDUs), each PDU comprising a sequence number of n bits for indicating a relative sequential ordering of the PDU in a transmitted or received stream of PDUs; and
   a transmission time interval (TTI) in which a predetermined number of PDUs are transmitted or received in a predetermined time interval;
the method comprising:
   receiving the predetermined number of PDUs within a TTI;
   determining a starting sequence number and an ending sequence number for the received PDUs within the TTI; and
   discarding any received PDU within the TTI that has a sequence number that is sequentially before the starting sequence number or that is sequentially after the ending sequence number;
   wherein obtaining the ending sequence number comprises utilizing information of the predetermined number of PDUs within the TTI.

2. The method of claim 1 wherein the starting sequence number is obtained from an ending sequence number of a previous TTI.

3. The method of claim 2 wherein the ending sequence number of the previous TTI is incremented by one to obtain the starting sequence number.

4. The method of claim 1 wherein the ending sequence number is obtained by subtracting one from a result of adding the predetermined number of PDUs within the TTI to the starting sequence number.

5. The method of claim 1 wherein the wireless communications protocol additionally utilizes a length indicator (LI) to indicate an ending position of an SDU within a PDU, and the method further comprises utilizing a special value for the LI to indicate that PDUs were discarded prior to transmission of the received PDUs.

6. The method of claim 5 wherein the special value for the LI enables transmission of sequence numbers in a manner that is predictable for a receiver so that the receiver may generate the starting sequence number and the ending sequence number.

7. The method of claim 6 wherein the sequence number of each and every successive PDU in the stream of PDUs is incremented by a fixed value.

8. The method of claim 7 wherein the fixed value is one.

9. A wireless communications system comprising:
   a first station capable of transmitting a stream of protocol data units (PDUs) comprising a predetermined number of PDUs in a transmission time interval (TTI) of a predetermined time interval, each PDU comprising a sequence number of n bits for indicating a relative sequential ordering of the PDU in the stream of PDUs; and
   a second station capable of receiving the stream of PDUs in the TTI, the second station utilizing:
      a starting sequence number;
      an ending sequence number; and
      an interface for generating the starting sequence number and the ending sequence number, and for discarding any received PDU within the TTI that has a sequence number that is sequentially before the starting sequence number or that is sequentially after the ending sequence number;
   wherein generating the ending sequence number comprises utilizing the information of the predetermined number of PDUs within the TTI.

10. The wireless communications system of claim 9 wherein the interface utilizes an ending sequence number of a previous TTI to obtain the starting sequence number.

11. The wireless communications system of claim 10 wherein the interface increments, the ending sequence number of the previous TTI by one to obtain the starting sequence number.

12. The wireless communications system of claim 9 wherein the interface obtains the ending sequence number by subtracting one from a result of adding the predetermined number of PDUs within the TTI to the starting sequence number.

13. The wireless communications system of claim 9 wherein the first station is further capable of utilizing a length indicator (LI) with a special value to indicate that PDUs were discarded by the first station prior to transmission of the stream of PDUs.

14. The wireless communications system of claim 13 wherein the special value for the LI enables the first station to transmit the stream of PDUs with sequence numbers in a manner that is predictable for the second station so that the second station may generate the starting sequence number and the ending sequence number.

15. The wireless communications system of claim 14 wherein the sequence number of each and every successive PDU in the stream of PDUs is incremented by a fixed value.

16. The wireless communications system of claim 15 wherein the fixed value is one.

17. A method for determining acceptable ranges of received sequence numbers in a wireless communications protocol, the wireless communications protocol utilizing protocol data units (PDUs) for transmitting service data units (PDUs), each PDU comprising a sequence number of n bits for indicating a relative sequential ordering of the PDU in a transmitted or received stream of PDUs, the method comprising:

determining a number of PDUs to be received and a corresponding transmission time interval (TTI);

receiving the number of PDUs within the transmission time interval (TTI);

determining a starting sequence number and an ending sequence number for the received PDUs within the TTI, the ending sequence number being derived from the starting sequence number and the number of PDUs to be received; and discarding any received PDU within the TTI that has a sequence number that is sequentially before the starting sequence number or that is sequentially after the ending sequence number.

18. The method of claim 17 wherein the starting sequence number is obtained from an ending sequence number of a previous TTI.

19. The method of claim 18 wherein the ending sequence number of the previous TTI is incremented by one to obtain the starting sequence number.

20. The method of claim 17 wherein the ending sequence number is obtained by subtracting one from a result of adding the number of PDUs within the TTI to the starting sequence number.

21. The method of claim 17 wherein the wireless communications protocol additionally utilizes a length indicator (LI) to indicate an ending position of an SDU within a PDU, and the method further comprises utilizing a special value for the LI to indicate that PDUs were discarded prior to transmission of the received PDUs.

22. The method of claim 21 wherein the special value for the LI enables transmission of sequence numbers in a manner that is predictable for a receiver so that the receiver may generate the starting sequence number and the ending sequence number.

23. The method of claim 22 wherein the sequence number of each and every successive PDU in the stream of PDUs is incremented by a fixed value.

24. The method of claim 23 wherein the fixed value is one.

* * * * *